(12) United States Patent
den Boer et al.

(10) Patent No.: US 10,935,853 B1
(45) Date of Patent: Mar. 2, 2021

(54) DUAL CELL DISPLAY WITH MOIRÉ IMPROVEMENT

(71) Applicant: a.u. Vista, Inc., Irvine, CA (US)

(72) Inventors: Willem den Boer, Irvine, CA (US); Adiel Abileah, Irvine, CA (US); Fang-Chen Luo, Irvine, CA (US); Seok-Lyul Lee, Hsinchu (TW); Tai Kang Wu, Hsinchu (TW)

(73) Assignee: A.U. VISTA, INC., Milpitas, CA (US)

( * ) Notice: Subject to any disclaimer, the term of this patent is extended or adjusted under 35 U.S.C. 154(b) by 0 days.

(21) Appl. No.: 16/590,900

(22) Filed: Oct. 2, 2019

(51) Int. Cl.
*G02F 1/1347* (2006.01)
*G02F 1/1335* (2006.01)
*G02F 1/1362* (2006.01)

(52) U.S. Cl.
CPC ...... *G02F 1/1347* (2013.01); *G02F 1/133514* (2013.01); *G02F 1/133528* (2013.01); *G02F 1/136286* (2013.01); *G02F 2001/133548* (2013.01); *G02F 2001/136222* (2013.01)

(58) Field of Classification Search
CPC .................................................. G02F 1/1347
See application file for complete search history.

(56) References Cited

U.S. PATENT DOCUMENTS

| | | | |
|---|---|---|---|
| 2008/0291368 A1 | 11/2008 | Park et al. | |
| 2018/0120659 A1 | 5/2018 | Kim et al. | |
| 2018/0275438 A1* | 9/2018 | Mori | G02F 1/136213 |
| 2019/0155072 A1* | 5/2019 | Hwang | G02F 1/133512 |
| 2019/0179204 A1* | 6/2019 | Bang | G02F 1/134309 |
| 2019/0285936 A1 | 9/2019 | Luo et al. | |

FOREIGN PATENT DOCUMENTS

| | | | |
|---|---|---|---|
| CN | 107797349 A | | 3/2018 |
| CN | 108983463 A | * | 12/2018 |

* cited by examiner

*Primary Examiner* — Alexander P Gross
(74) *Attorney, Agent, or Firm* — Tim Tingkang Xia, Esq.; Locke Lord LLP

(57) ABSTRACT

A display cell structure includes a first substrate and a second substrate spaced apart from each other, and a polarizer layer disposed between the two substrates, forming a first cell gaps between the first substrate and the polarizer layer, and a second cell gap between the second substrate and the polarizer layer. A first display structure is disposed in the first cell gap, and a second display structure is disposed in the second cell gap. The first display structure includes a plurality of first signal lines, forming a first signal line pattern. The second display structure includes a plurality of second signal lines, forming a second signal line pattern. The second signal line is different from the first signal line pattern. The polarizer layer may be a wire grid polarizer layer.

20 Claims, 12 Drawing Sheets

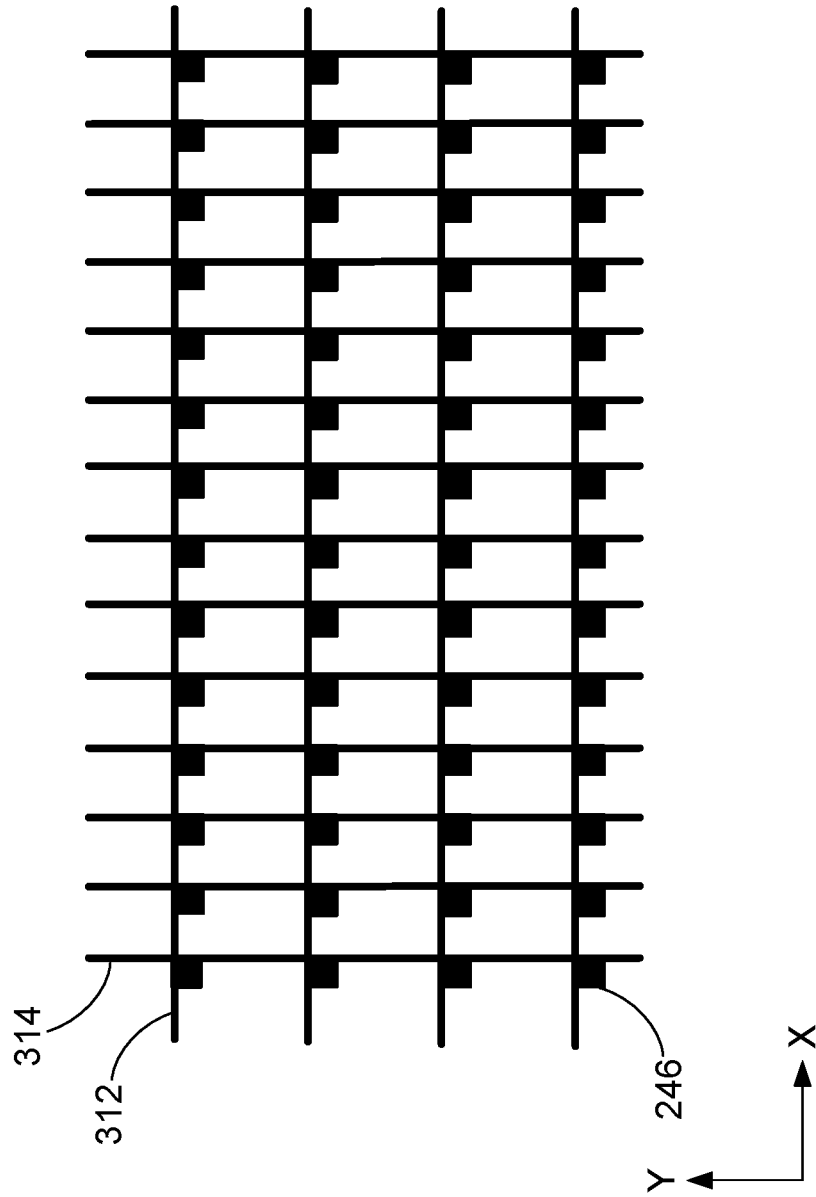

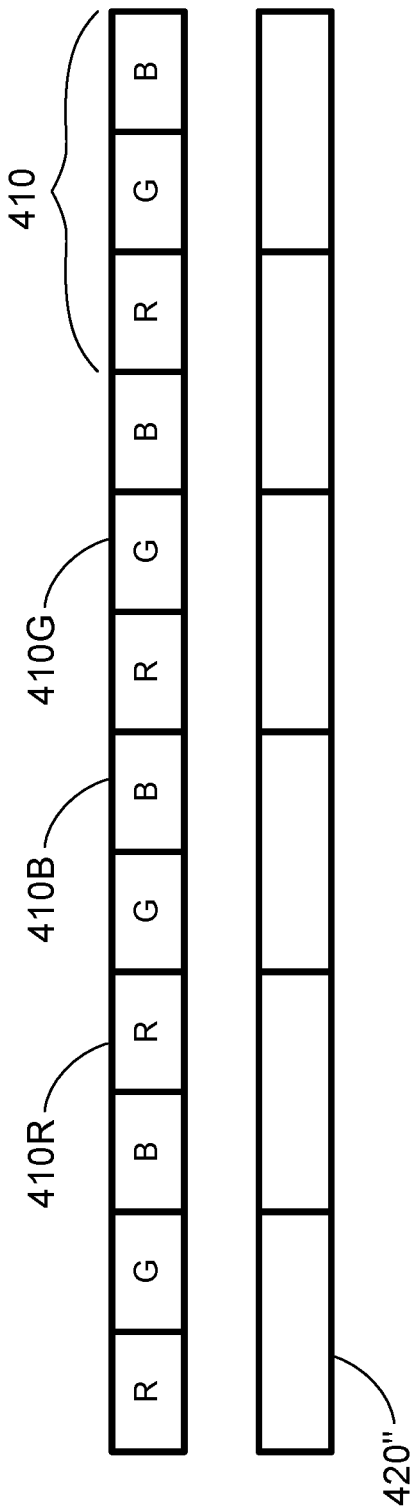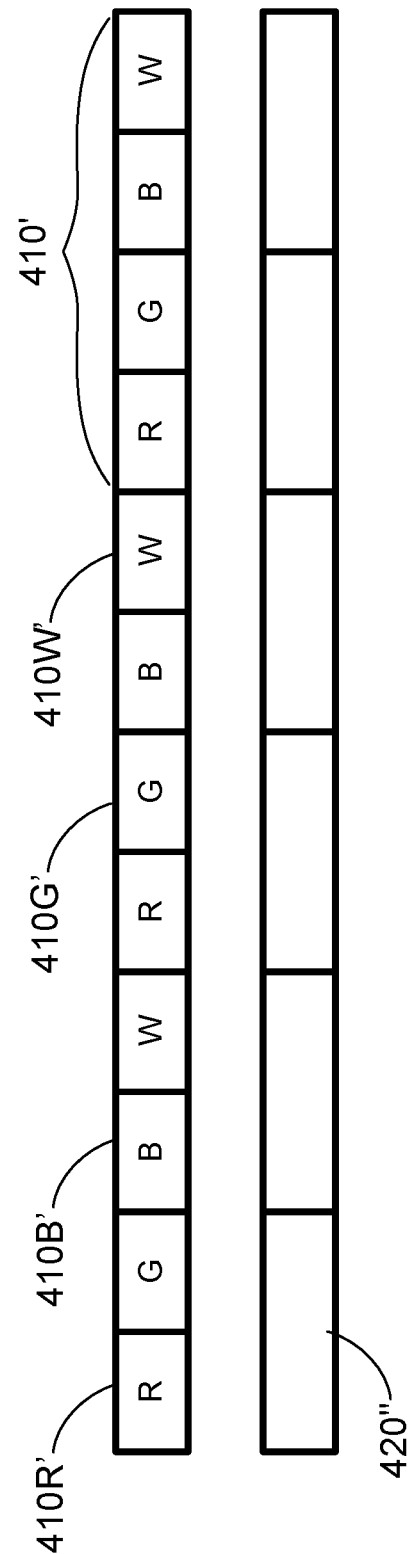

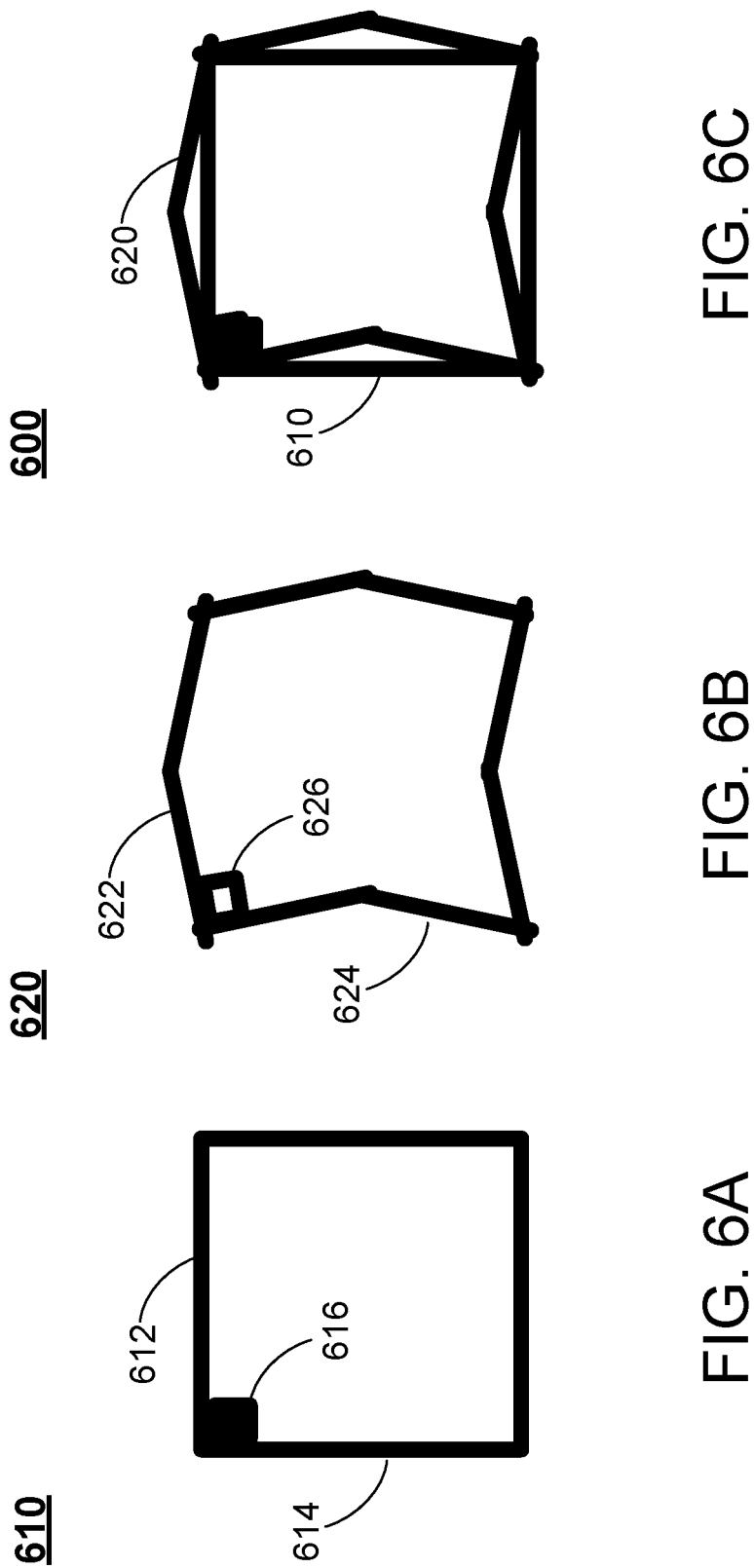

DUAL CELL DISPLAY WITH MOIRÉ IMPROVEMENT

FIELD

The disclosure relates generally to display technology, and more particularly to a dual cell display panel with moiré improvement.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

High dynamic range (HDR) liquid crystal displays (LCDs) have been developed for years as TV and mobile display technology to fend off competition from organic light emitting diode (OLED) displays. The purpose of the HDR technology is to obtain very high contrast ratios of more than 10,000 to 1, which cannot be achieved with conventional LCDs and backlights.

Currently, there are several methods to form HDR LCDs. For example, local dimming in LCD TVs is typically done by controlling a few hundred LEDs in the backlight to improve dynamic range, which works well, but does not entirely eliminate annoying halo effects around brightly lit pixels on a dark background. Another method is to use mini-LED backlights in a LCD, which can have a few thousand or more LEDs. The mini-LED backlights show better performance, but are still relatively expensive. When mini-backlights are controlled by an active matrix TFT backplane, they are quite power hungry as a result of power losses in the drive TFT for each mini-LED.

Therefore, a heretofore unaddressed need exists in the art to address the aforementioned deficiencies and inadequacies.

SUMMARY

One aspect of the disclosure relates to a display cell structure, which includes: a first substrate and a second substrate spaced apart from each other; a first polarizer layer disposed on the first substrate facing an opposite side to the second substrate; a second polarizer layer disposed between the first substrate and the second substrate, forming a first cell gap between the first substrate and the second polarizer layer and a second cell gap between the second substrate and the second polarizer layer; a third polarizer layer disposed on the second substrate facing an opposite side to the first substrate; a first display structure disposed in the first cell gap between the first substrate and the second polarizer layer, the first display structure comprising: a first liquid crystal layer disposed in the first cell gap between the first substrate and the second polarizer layer, defining a plurality of first pixels; and a plurality of color filters disposed on the first substrate and facing the second polarizer layer; and a plurality of first signal lines disposed on the first substrate and facing the second polarizer layer, forming a first signal line pattern; a second display structure disposed in the second cell gap between the second substrate and the second polarizer layer, the second display structure comprising: a second liquid crystal layer disposed in the second cell gap between the second substrate and the second polarizer layer, defining a plurality of second pixels; and a plurality of second signal lines disposed on the second substrate and facing the second polarizer layer, forming a second signal line pattern, wherein the second signal line pattern is different from the first signal line pattern.

In certain embodiments, the first signal lines comprise a plurality of first data lines along a first direction, and a plurality of first gate lines along a second direction, and the second signal lines comprise a plurality of second data lines substantially along the first direction, and a plurality of second gate lines substantially along the second direction.

In certain embodiments, the first signal lines are straight lines, and the second signal lines are zigzag lines or curved lines.

In certain embodiments, each of the second signal lines is a saw-tooth shaped line such that for each of the first pixels and a corresponding one of the second pixels, the second signal lines are tilted from the corresponding first signal lines.

In certain embodiments, a tilt angle of each of the second signal lines and the corresponding first signal line is greater than 3° and less than 45°.

In certain embodiments, the second signal lines are the zigzag lines, and for each of the second pixels, the second signal lines include one or more waves.

In certain embodiments, the second polarizer layer is a wire grid polarizer layer.

In certain embodiments, a first size of each of the first pixels is different from a second size of each of the second pixels, and the second size is greater than the first size.

In certain embodiments, each of the first pixels comprises a plurality of first sub-pixels, each of the second pixels comprises a plurality of second sub-pixels, and each of the second sub-pixels corresponds to two of the first sub-pixels.

In certain embodiments, each of the first pixels comprises a plurality of first sub-pixels, each of the second pixels comprises a plurality of second sub-pixels, and each of the second sub-pixels corresponds to three of the first sub-pixels.

In certain embodiments, the second signal line pattern overlays with the first signal line pattern at edges of sub-pixels of the first pixels and the second pixels.

In another aspect of the disclosure, a display cell structure includes: a first substrate and a second substrate spaced apart from each other; a first polarizer layer disposed on the first substrate facing an opposite side to the second substrate; a second polarizer layer disposed between the first substrate and the second substrate, forming a first cell gap between the first substrate and the second polarizer layer and a second cell gap between the second substrate and the second polarizer layer; a third polarizer layer disposed on the second substrate facing an opposite side to the first substrate; a first display structure disposed in the first cell gap between the first substrate and the second polarizer layer, the first display structure comprising: a first liquid crystal layer disposed in the first cell gap between the first substrate and the second polarizer layer, defining a plurality of first pixels; and a plurality of color filters disposed on the first substrate and facing the second polarizer layer; and a plurality of first signal lines disposed on the first substrate and facing the second polarizer layer, forming a first signal line pattern; a second display structure disposed in the second cell gap between the second substrate and the second polarizer layer, the second display structure comprising: a second liquid crystal layer disposed in the second cell gap between the second substrate and the second polarizer layer, defining a plurality of second pixels; and a plurality of second signal lines disposed on the second substrate and facing the second polarizer layer, forming a second signal line pattern, wherein the second signal line pattern overlays with the first signal line pattern at edges of sub-pixels of the first pixels and the second pixels, the first signal lines are straight lines, and the second signal lines are zigzag lines or curved lines.

In certain embodiments, the first signal lines comprise a plurality of first data lines along a first direction, and a plurality of first gate lines along a second direction, and the second signal lines comprise a plurality of second data lines substantially along the first direction, and a plurality of second gate lines substantially along the second direction.

In certain embodiments, the first signal lines are straight lines, and the second signal lines are zigzag lines or curved lines.

In certain embodiments, each of the second signal lines is a saw-tooth shaped line such that for each of the first pixels and a corresponding one of the second pixels, the second signal lines are tilted from the corresponding first signal lines.

In certain embodiments, a tilt angle of each of the second signal lines and the corresponding first signal line is greater than 3° and less than 45°.

In certain embodiments, the second signal lines are the zigzag lines, and for each of the second pixels, the second signal lines include one or more waves.

In certain embodiments, the second polarizer layer is a wire grid polarizer layer.

In certain embodiments, a first size of each of the first pixels is different from a second size of each of the second pixels, and the second size is greater than the first size.

In certain embodiments, the second pixels do not one-to-one correspond to the first pixels.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein:

FIG. 3A schematically shows a top view of signal lines of the first display structure of the display cell structure as shown in FIG. 2 according to certain embodiments of the present disclosure.

FIG. 4C schematically shows a plurality of first pixels and a plurality of second pixels according to certain embodiments of the present disclosure, where the first pixels include RGB sub-pixels, and each of the second pixels corresponds to two sub-pixels of the first pixels.

FIG. 4D schematically shows a plurality of first pixels and a plurality of second pixels according to certain embodiments of the present disclosure, where the first pixels include RGBW sub-pixels, and each of the second pixels corresponds to two sub-pixels of the first pixels.

FIG. 6A schematically shows signal lines of a first sub-pixel according to certain embodiments of the present disclosure.

FIG. 6B schematically shows signal lines of a second pixel according to certain embodiments of the present disclosure.

FIG. 6C schematically shows an overlapping top view of the signal lines as shown in FIG. 6A and the signal lines as shown in FIG. 6B according to certain embodiments of the present disclosure.

DETAILED DESCRIPTION OF THE DISCLOSURE

Figure 1:
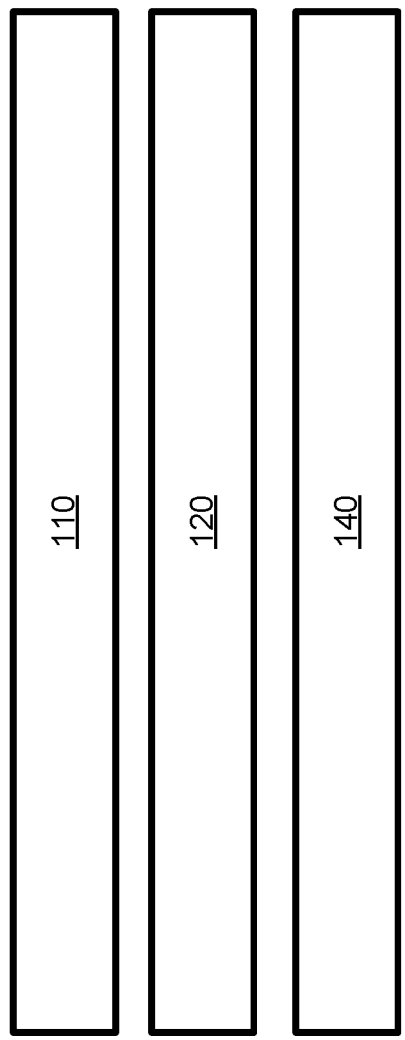
FIG. 1 schematically shows a dual display cell structure of a display device according to certain embodiments of the present disclosure.

The present disclosure will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom", "upper" or "top", and "left" and "right", may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper", depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

The description will be made as to the embodiments of the present disclosure in conjunction with the accompanying drawings. In accordance with the purposes of this disclosure, as embodied and broadly described herein, this disclosure, in certain aspects, relates to a display panel and a display device using the same.

As discussed above, there are several methods to form HDR LCDs. One method of forming a HDR LCD involves a dual cell LCD, which includes a dual display cell structure, where one display cell is used for pixel level dimming and the other display cell is used for providing the actual displaying function.

FIG. 1 schematically shows a dual display cell structure of a display device according to certain embodiments of the present disclosure. As shown in FIG. 1, the dual display cell structure 100 includes a first display structure 110, a second display structure 120, and a backlight module 140. The first display structure 110 is located at a display side (i.e., the top side of FIG. 1) of the display device, and functions as a display structure, which may include structures of the color pixel structure of a typical display structure. In contrast, the second display structure 120 is located at a backlight side (i.e., the bottom side of FIG. 1), and functions as a shutter or dimming structure. Each of the first display structure 110 and the second display structure 120 includes a respective liquid crystal layer and a polarizer layer (not shown in FIG. 1), such that the first display structure 110 and the second display structure 120 respectively form two independent liquid crystal assembly structures. To provide color displaying feature, the first display structure 110 may further include color filters or other structures forming the color pixels. The backlight module 140 is located at the backlight side to function as the light source of the display device. The first display structure 110 and the second display structure 120 are aligned to each other as accurately as possible (in all 3 axes—x, y, θ). The display device which adopts the dual cell structure 100 as shown in FIG. 1 is quite effective to obtain HDR functionalities.

However, the dual cell structure 100, which is formed by the combination of the two display structures 110 and 120, adds thickness, cost, weight, and complexity and reduces the luminance of the display device significantly.

Further, moiré effect may occur in the dual cell structure 100. The moiré patterns appear when the two similar patterns of overlapping symmetrical structures, such as the two display structures 110 and 120 as shown in FIG. 1, have small differences. In this case, the grid bus lines of the first display structure 110 may be parallel to the bus lines of the second display structure 120, and the bus lines of the two display structures may have a small location shift relative to each other, resulting in the moiré effect. The moiré effect may be reduced by adding a diffusing layer between the first display structure 110 and the second display structure 120. However, the diffusing layer does not minimize the moiré patterns. One existing technique to reduce or eliminate the moiré effect may include rotating one grid relative to the other at an angle, which causes the moiré pattern pitch to be so large that the human eyes cannot distinguish it. However, such technique may require the two display structures 110 and 120 not to overlap with each other, and would cause the matching pixels of the two display structures 110 and 120 to be driven with different intensities.

In view of the above deficiencies, one aspect of the present disclosure relates to a display cell structure, which modifies the dual cell structure 100 as shown in FIG. 1 to reduce complexity, thickness, weight and cost of a dual cell LCD system.

Figure 2:
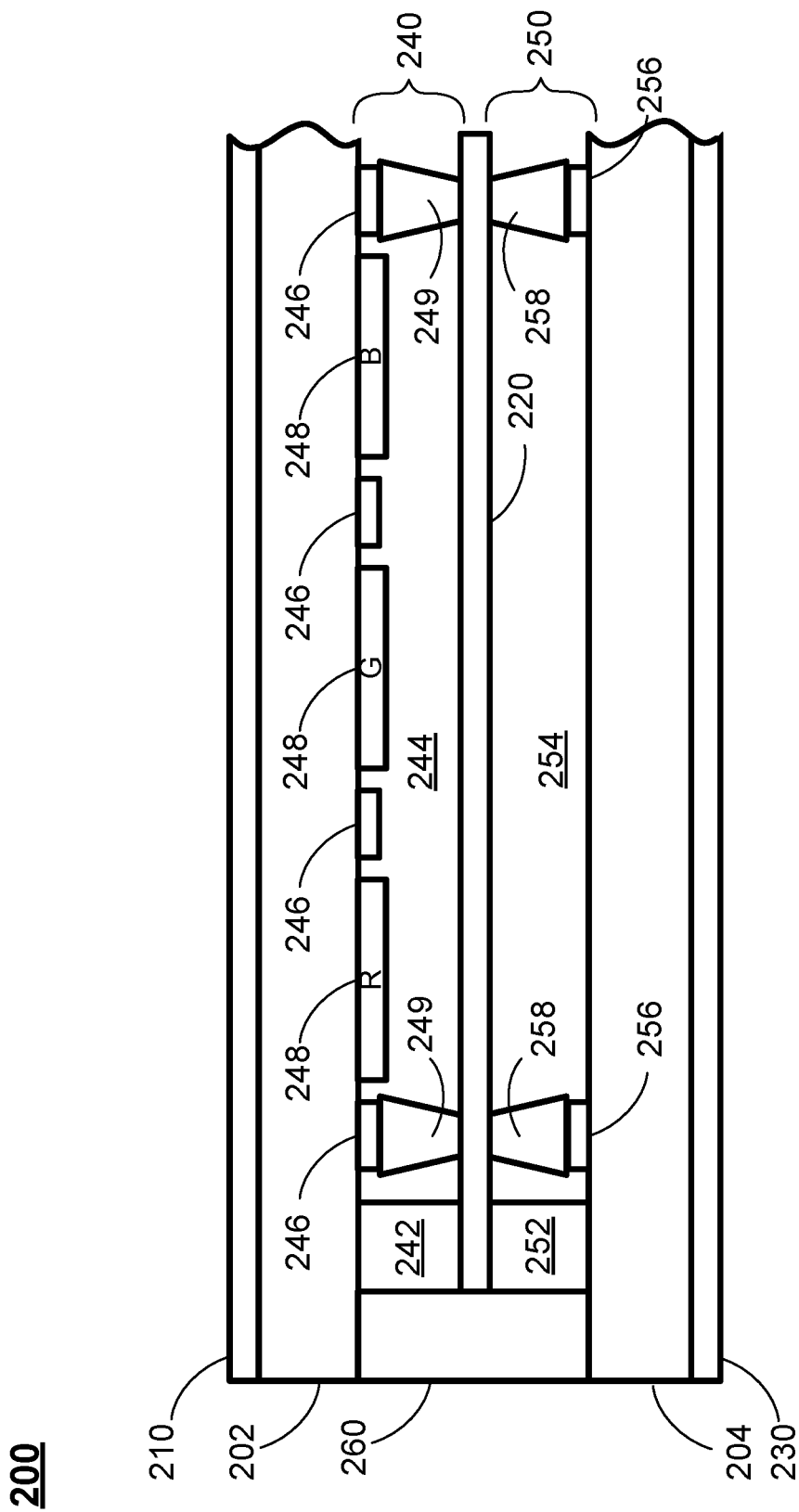
FIG. 2 schematically shows a partial sectional side view a display cell structure according to certain embodiments of the present disclosure.

FIG. 2 schematically shows a partial sectional side view of a display cell structure according to certain embodiments of the present disclosure. As shown in FIG. 2, the display cell structure 200 includes a first substrate 202, a second substrate 204, a first polarizer layer 210, a second polarizer layer 220, a third polarizer layer 230, a first display structure 240 and a second display structure 250. The first substrate 202 and the second substrate 204 are spaced apart from each other, where the first substrate 202 is located at a display side (i.e., the top side of FIG. 2) of the display cell structure 200, and the second substrate 204 is located at a backlight side (i.e., the bottom side of FIG. 2) of the display cell structure 200. The first polarizer layer 210 is disposed on the first substrate 202 facing an opposite side to the second substrate 204. The third polarizer layer 230 is disposed on the second substrate 204 facing an opposite side to the first substrate 202. The second polarizer layer 220 is disposed between the first substrate 202 and the second substrate 204, forming a first cell gap between the first substrate 202 and the second polarizer layer 220 and a second cell gap between the second substrate 204 and the second polarizer layer 220, such that the first display structure 240 may be disposed in the first cell gap, and the second display structure 250 may be disposed in the second cell gap. In this case, the first display structure 240 functions as a display structure, and the second display structure 250 functions as a shutter or dimming structure.

As shown in FIG. 2, the first display structure 240 is a color-on array TFT display structure, which includes a first seal 242, a first liquid crystal layer 244, a plurality of first thin-film transistors (TFTs) 246 on the first substrate 202, a plurality of color filters 248 on the first substrate 202 and a plurality of patterned spacers 249. The first liquid crystal layer 244 is disposed in the first cell gap between the first substrate 202 and the second polarizer layer 220, defining a plurality of first pixels. In certain embodiments, the first liquid crystal layer 244 can be an in-plane switching (IPS) liquid crystal layer, a fringe field switching (FFS) liquid crystal layer, a multi-domain vertical alignment (MVA) liquid crystal layer or a pattern vertical alignment (PVA) liquid crystal layer. The first seal 242 is disposed at the side of the first cell gap to seal the first liquid crystal layer 244. Each first pixel has a corresponding TFT 246 and a corresponding color filter 248. For example, FIG. 2 shows a first pixel, which includes three first sub-pixels, including a red (R) sub-pixel, a green (G) sub-pixel and a blue (B) sub-pixel. The patterned spacers 249 are disposed for providing the accurate gap space for the first gap cell. Corresponding, the second display structure 250 includes a second seal 252, a second liquid crystal layer 254, a plurality of second TFTs 256 on the second substrate 204 and a plurality of patterned spacers 258. The second liquid crystal layer 254 is disposed in the second cell gap between the second substrate 204 and the second polarizer layer 220, defining a plurality of second pixels. In certain embodiments, the second liquid crystal layer 254 can be an IPS liquid crystal layer, a FFS liquid crystal layer or a VA liquid crystal layer. The second seal 252 is disposed at the side of the second cell gap to seal the second liquid crystal layer 254. Each second pixel has a corresponding TFT 256. For example, FIG. 2 shows one second pixel in the second display structure 250, which corresponds to the three sub-pixels of the first pixel of the first display structure 240. The patterned spacers 258 are disposed for providing the accurate gap space for the second gap cell. Further, at an outermost side of the display cell structure 200, an optional reinforcing seal 260 may be added between the first substrate 202 and the second substrate 204 to further ensure sealing of both the first cell gap and the second cell gap and enhance mechanical strength of the entire structure. It should be noted that the second display structure 250 is provided as the shutter or dimming structure, and thus does not need to include the color filters. The first display structure 240 and the second display structure 250 are aligned to each other as accurately as possible.

In the display cell structure 200 as shown in FIG. 2, only two substrates 202 and 204 are required, and the thickness of each of the first substrate 202 and the second substrate 204 may be about 0.7 mm or less, such that the first substrate 202 and the corresponding TFTs 246 and color filters 248 of the first display structure 240 form a first TFT backplane, and the second substrate 204 and the corresponding TFTs 256 of the second display structure 250 form a second TFT backplane.

Further, as shown in FIG. 2, only three polarizer layers 210, 220 and 230 are required. The second polarizer layer 220, which is located between the first display structure 240 and the second display structure 250, provides a double function as an exit polarizer for the second display structure 250 (i.e., the shutter or dimming structure) and an entry polarizer for the first display structure 240 (i.e., the display structure). Thus, the second polarizer layer 220 needs to be very smooth such that the size of each of the first cell gap and the second cell gap can be controlled to be within 0.1 μm. In certain embodiments, the second polarizer layer 220 can be a conventional polarizer layer or a wire grid polarizer layer.

It should be particularly noted that the display cell structure 200 as shown in FIG. 2 may include other structures not shown in FIG. 2. For example, each of the first display structure 240 and the second display structure 250 may include other structures or layers. For example, for VA LC, the first display structure 240 may include a first transparent common electrode disposed on the second polarizer layer 220 facing the first liquid crystal layer 244, and the second display structure 250 may include a second transparent common electrode disposed on the second polarizer layer 220 facing the second liquid crystal layer 254. When IPS or FFS LC modes are used, such transparent common electrodes may not be needed, since the common electrodes for these modes are on the TFT substrates.

Figure 3B:
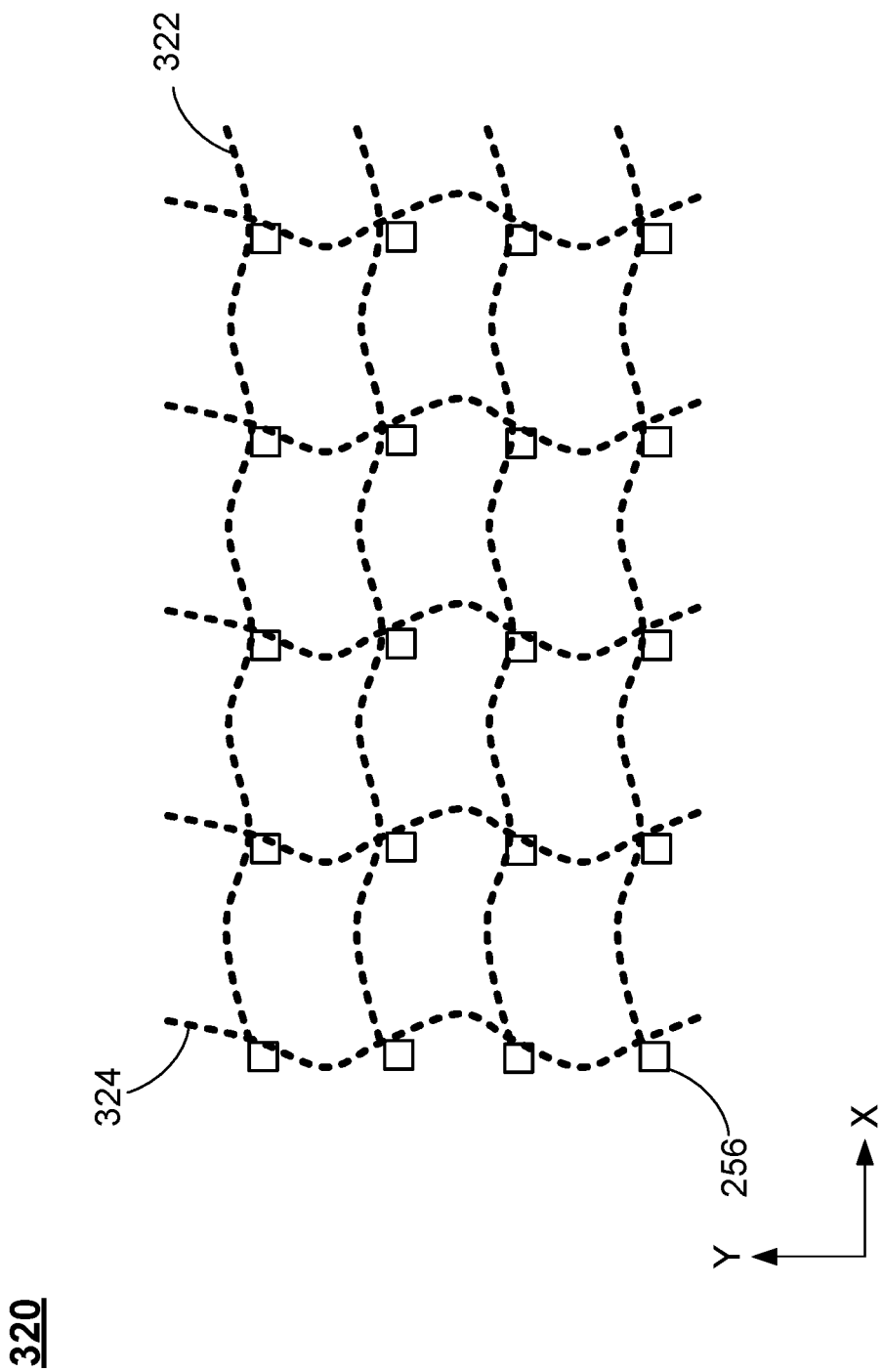
FIG. 3B schematically shows a top view of signal lines of the second display structure of the display cell structure as shown in FIG. 2 according to certain embodiments of the present disclosure.
Figure 3C:
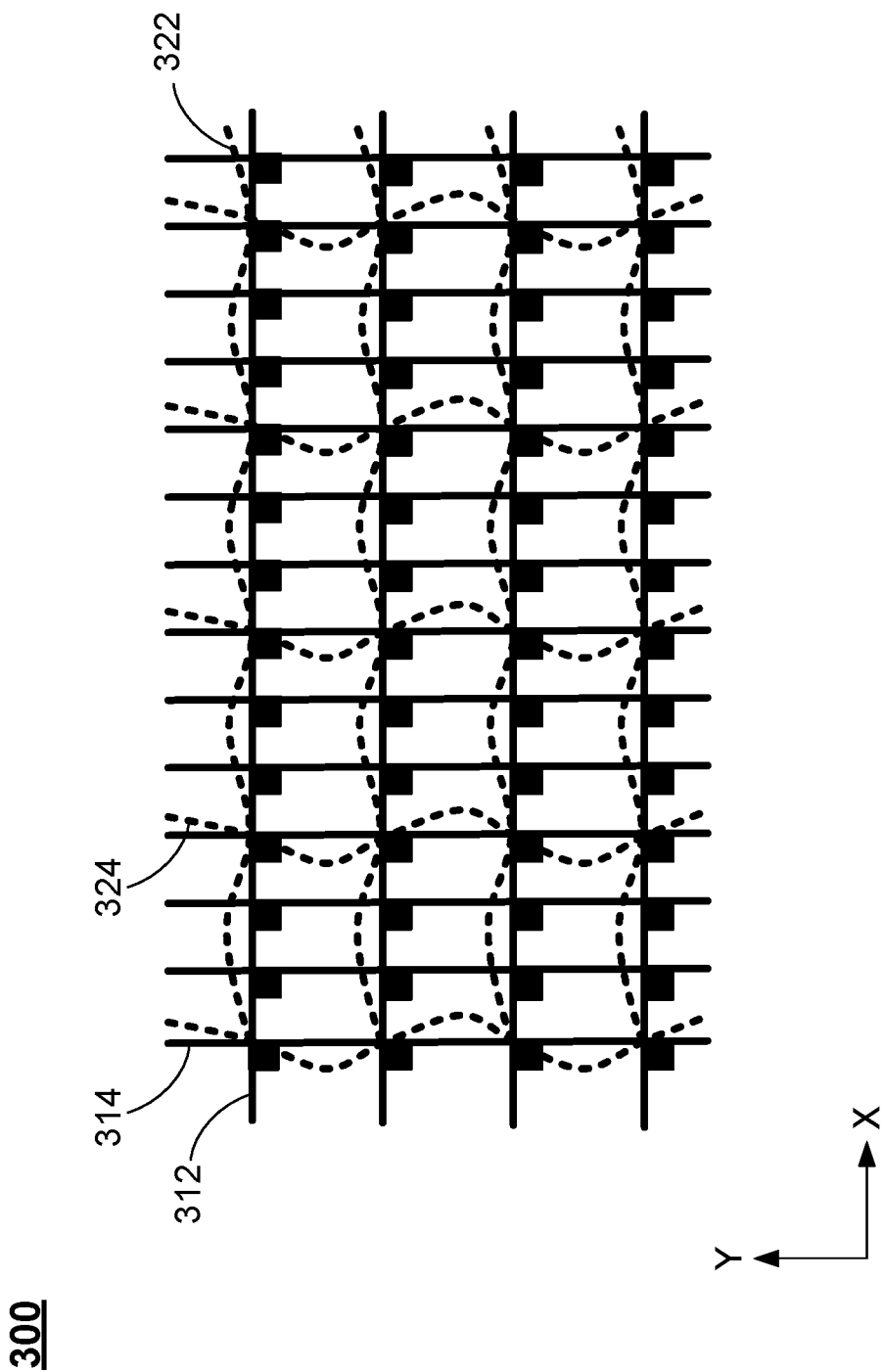
FIG. 3C schematically shows an overlapping top view of the signal lines as shown in FIG. 3A and the signal lines as shown in FIG. 3B according to certain embodiments of the present disclosure.

One feature of the display cell structure 200 as shown in FIG. 2 exists in that the signal line patterns of the first display structure 240 and the second display structure 250 are different from each other. For example, FIG. 3A schematically shows a top view of signal lines of the first display structure of the display cell structure as shown in FIG. 2 according to certain embodiments of the present disclosure, and FIG. 3B schematically shows a top view of signal lines of the second display structure of the display cell structure as shown in FIG. 2 according to certain embodiments of the present disclosure. As shown in FIG. 3A, the signal lines of the first display structure 240 include a plurality of first gate lines 312 along a horizontal direction and a plurality of first data lines 314 along a vertical direction, forming a first signal line pattern 310. In certain embodiments, the first gate lines 312 and the first data lines 314 are formed on the first substrate 202 as a part of the first TFT backplane. Each of the first gate lines 312 is a straight line, and is electrically connected to a row of the TFTs 246. Each of the first data lines 314 is a straight line, and is electrically connected to a column of the TFTs 246. Further, as shown in FIG. 3B, the signal lines of the second display structure 250 include a plurality of second gate lines 322 substantially along the horizontal direction X and a plurality of second data lines 324 substantially along the vertical direction Y, forming a second signal line pattern 320. In certain embodiments, the second gate lines 322 and the second data lines 324 are formed on the second substrate 204 as a part of the second TFT backplane. It should be noted that the second gate lines 322 are "substantially" along the horizontal direction X because each of the second gate lines 322 is a curved line, and each of the second gate lines 322 is electrically connected to a row of the TFTs 256. Similarly, the second data lines 324 are "substantially" along the vertical direction Y because each of the second data lines 324 is a curved line, and each of the second data lines 324 is electrically connected to a column of the TFTs 256. FIG. 3C schematically shows an overlapping top view of the signal lines as shown in FIG. 3A and the signal lines as shown in FIG. 3B. As discussed above, the first display structure 240 and the second display structure 250 are aligned to each other as accurately as possible, such that the second signal line pattern 320 (which is formed by the second gate lines 322 and the second data lines 324) at least partially overlays with the first signal line pattern 310 (which is formed by the first gate lines 312 and the first data lines 314) at edges of sub-pixels of the first pixels and the second pixels, as shown in FIG. 3C. Further, as shown in FIG. 3C, the intersection points of the second gate lines 322 and the second data lines 324 in the second signal line pattern 320 overlap with a portion of the intersection points of the first gate lines 312 and the first data lines 314 in the first signal line pattern 310. However, as shown in FIG. 3C, the second signal line pattern 320 is different from the first signal line pattern 310. By breaking the similarity of the two signal line patterns 310 and 320, the moiré effect can be minimized.

Figure 4A:
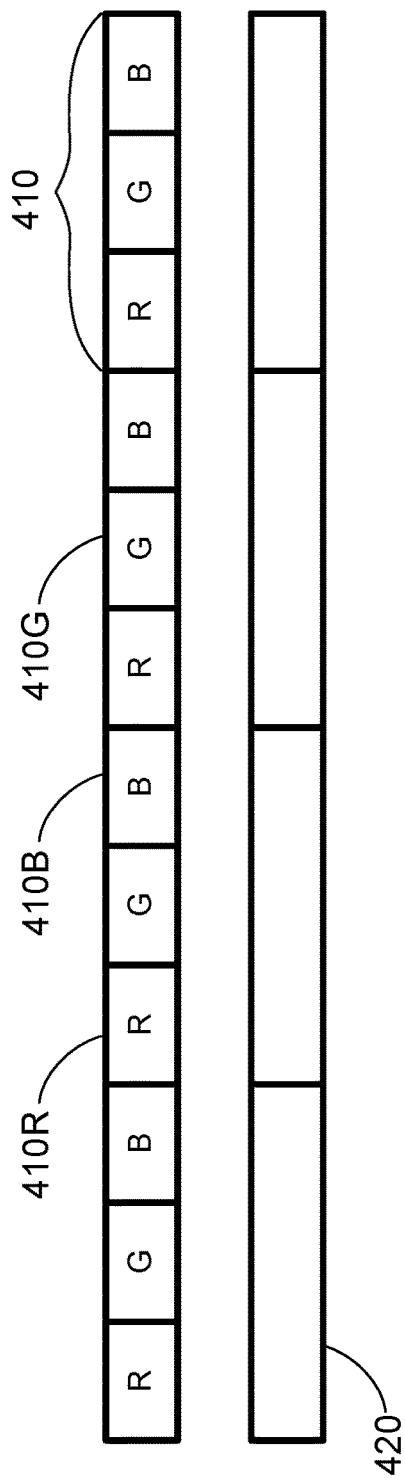
FIG. 4A schematically shows a plurality of first pixels and a plurality of second pixels according to certain embodiments of the present disclosure, where the first pixels include RGB sub-pixels, and each of the second pixels corresponds to three sub-pixels of the first pixels.

As shown in FIG. 2, each of the second pixels in the second display structure 250 corresponds to one first pixel in the first display structure 240, such that the second pixel is used to control the shutter or dimming of the RGB sub-pixels of the corresponding first pixel. In this case, the size of each of the first pixels is substantially identical to the size of each of the second pixels. In certain embodiments, the size of each of the first pixels may be different from the size of each of the second pixels. For example, FIGS. 4A to 4D schematically show a plurality of first pixels and a plurality of second pixels according to certain embodiments of the present disclosure. As shown in FIG. 4A, the first pixels 410 are RGB pixels, and each first pixel 410 includes three sub-pixels, including a R sub-pixel 410R, a G sub-pixel 410G and a B sub-pixel 410B. Each of the second pixels 420 corresponds to three sub-pixels of the first pixels 410. In other words, each of the second pixels 420 corresponds to one first pixel 410.

Figure 4B:
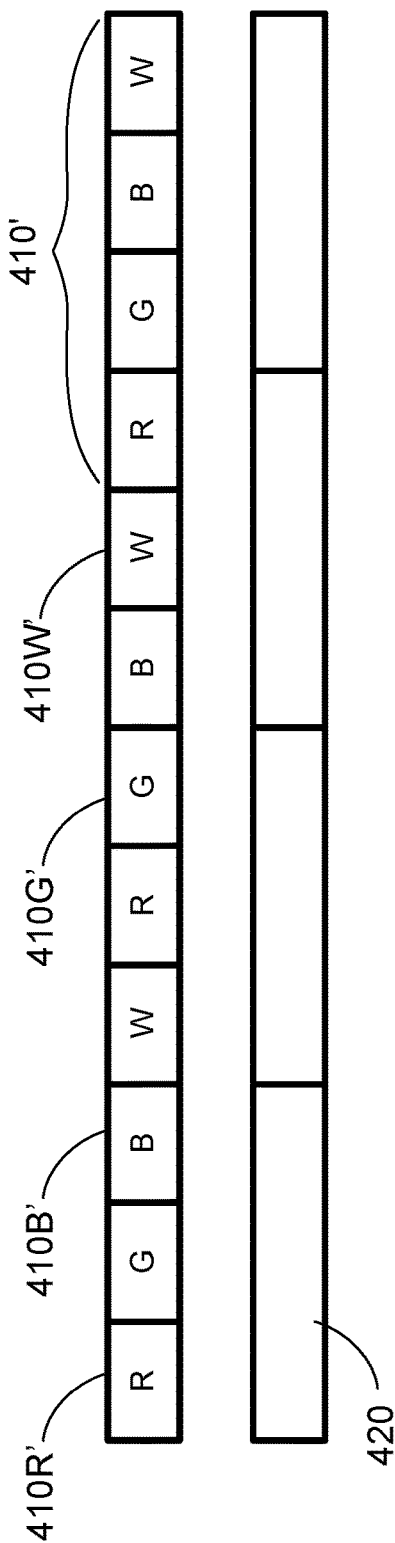
FIG. 4B schematically shows a plurality of first pixels and a plurality of second pixels according to certain embodiments of the present disclosure, where the first pixels include RGBW sub-pixels, and each of the second pixels corresponds to three sub-pixels of the first pixels.

In comparison, as shown in FIG. 4B, the first pixels 410' are RGBW pixels, and each first pixel 410' includes four sub-pixels, including a R sub-pixel 410R', a G sub-pixel 410G', a B sub-pixel 410B' and a W sub-pixel 410W'. Meanwhile, each of the second pixels 420 maintains corresponding to three of the four sub-pixels of the first pixels 410'. In this case, the second pixels 420 do not one-to-one correspond to the first pixels 410'.

Further, as shown in FIG. 4C, the first pixels 410 are RGB pixels, and each first pixel 410 includes three sub-pixels, including a R sub-pixel 410R, a G sub-pixel 410G and a B sub-pixel 410B. On the other hand, each of the second pixels 420' corresponds to only two of the three sub-pixels of the first pixels 410. In this case, the second pixels 420' do not one-to-one correspond to the first pixels 410.

Moreover, as shown in FIG. 4D, the first pixels 410' are RGBW pixels, and each first pixel 410' includes four sub-pixels, including a R sub-pixel 410R', a G sub-pixel 410G', a B sub-pixel 410B' and a W sub-pixel 410W'. Meanwhile, each of the second pixels 420' corresponds to two of the four sub-pixels of the first pixels 410'. In this case, the second pixels 420' do not one-to-one correspond to the first pixels 410', allowing the display quality of the display cell structure 400' to further improve.

As shown in any one of FIGS. 4B, 4C and 4D, the size of each of the first pixels is different from the size of each of the second pixels. In each case, the size of each second pixel is greater than the size of each first sub-pixel.

Figure 5:
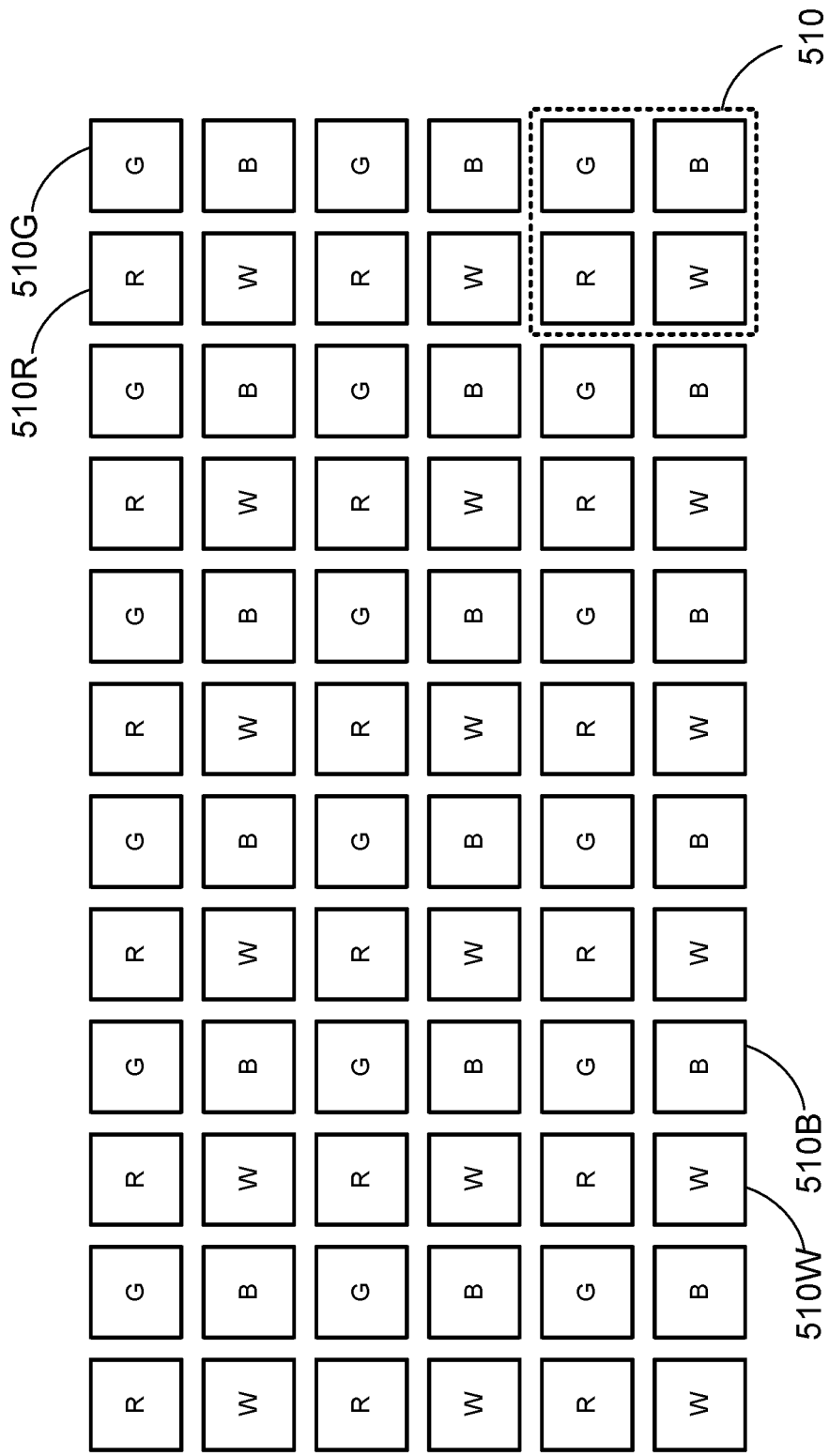
FIG. 5 schematically shows a plurality of first pixels arranged in a quad pixel structure according to certain embodiments of the present disclosure.

In certain embodiments, the color pixel arrangement of the first pixels in the first display structure may vary. For example, FIG. 5 schematically shows a plurality of first pixels arranged in a quad pixel structure according to certain embodiments of the present disclosure. As shown in FIG. 5, in the quad pixel structure 500, each of the first pixels 510 includes a R sub-pixel 510R, a G sub-pixel 510G, a B sub-pixel 510B and a W sub-pixel 510W. In each first pixel 510, the four sub-pixels are arranged in a 2*2 matrix, where the R sub-pixel 510R and the G sub-pixel 510G form a first row, and the W sub-pixel 510W and the B sub-pixel 510B form a second row parallel to the first row. In this case, each row includes two of the four sub-pixels.

As shown in FIG. 5, in the quad pixel structure 500, each of the first pixels 510 has four sub-pixels arranged in a 2*2 matrix. In this case, the second pixels in the second display structure 250 may have different arrangement. In certain embodiments, for example, the second pixels may one-to-one corresponds to each of the sub-pixels of the first pixels 510, such that the luminance of each of the RGBW colors may be respectively controlled by the second pixels. In this case, the second signal line pattern of the second display structure 250 may vary. For example, FIGS. 6A, 6B and 6C schematically show the signal lines of a first sub-pixel and the corresponding second pixel according to one embodiment of the present disclosure. As shown in FIG. 6A, the signal lines of the first sub-pixel 610 include a first gate line 612 and a first data line 614, which are both straight lines and electrically connected to the TFT 616. As shown in FIG. 6B, the signal lines of the second pixel 620 include a second gate line 622 and a second data line 624, which are both zigzag lines including one wave in the second pixel 620 and electrically connected to the TFT 626. FIG. 6C shows schematically shows an overlapping top view of the signal lines as shown in FIG. 6A and the signal lines as shown in FIG. 6B, where the second signal line pattern (which is formed by the second gate lines 622 and the second data lines 624) at least partially overlays with the first signal line pattern (which is formed by the first gate lines 612 and the first data lines 614) at edges of the first sub-pixel 610 and the second pixel 620.

Figure 7C:
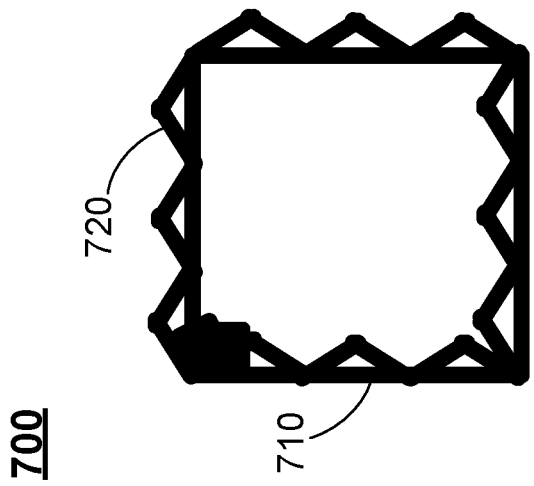
FIG. 7C schematically shows an overlapping top view of the signal lines as shown in FIG. 7A and the signal lines as shown in FIG. 7B according to certain embodiments of the present disclosure.
Figure 7B:
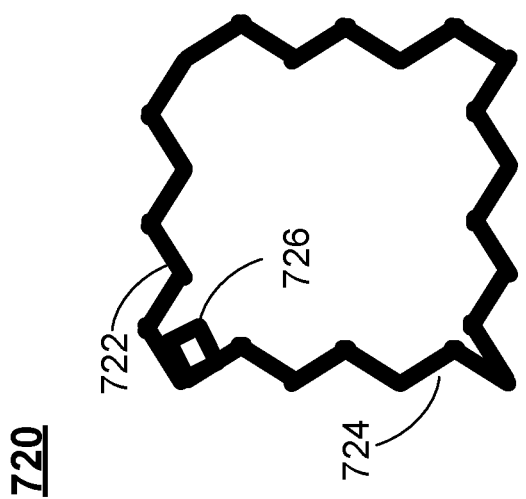
FIG. 7B schematically shows signal lines of a second pixel according to certain embodiments of the present disclosure.
Figure 7A:
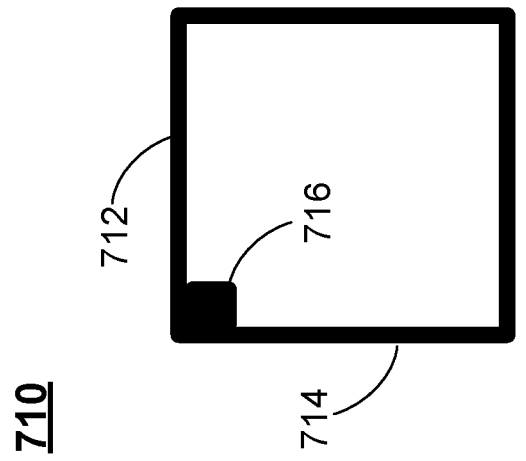
FIG. 7A schematically shows signal lines of a first sub-pixel according to certain embodiments of the present disclosure.

As shown in FIG. 6B, the second gate line 622 and the second data line 624 are both zigzag lines including one wave along the sides of the second pixel 620. However, the quantity of the waves of the zigzag lines along the sides of the second pixel may vary. For example, FIGS. 7A, 7B and 7C schematically show the signal lines of a first sub-pixel and the corresponding second pixel according to another embodiment of the present disclosure. As shown in FIG. 7A, the signal lines of the first sub-pixel 710 include a first gate line 712 and a first data line 714, which are both straight lines and electrically connected to the TFT 716. As shown in FIG. 7B, the signal lines of the second pixel 720 include a second gate line 722 and a second data line 724, which are both zigzag lines including three waves in the second pixel 720 and electrically connected to the TFT 726. FIG. 7C shows schematically shows an overlapping top view of the signal lines as shown in FIG. 7A and the signal lines as shown in FIG. 7B, where the second signal line pattern (which is formed by the second gate lines 722 and the second data lines 724) at least partially overlays with the first signal line pattern (which is formed by the first gate lines 712 and the first data lines 714) at edges of the first sub-pixel 710 and the second pixel 720.

Figure 8C:
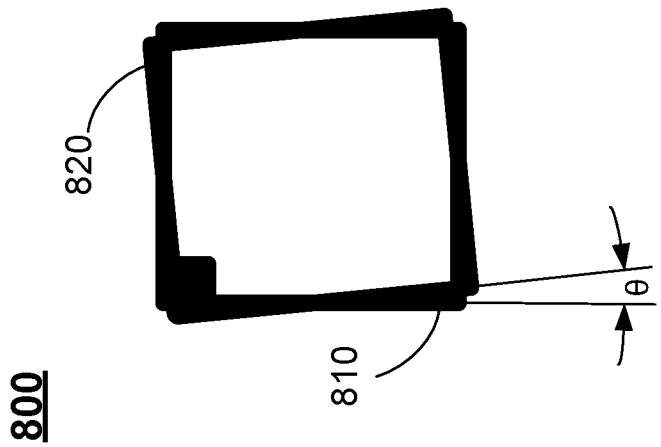
FIG. 8C schematically shows an overlapping top view of the signal lines as shown in FIG. 8A and the signal lines as shown in FIG. 8B according to certain embodiments of the present disclosure.
Figure 8B:
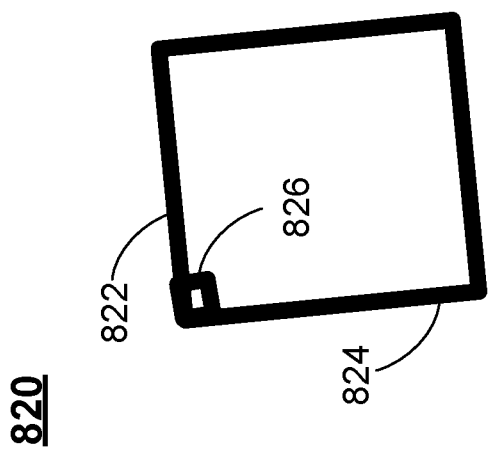
FIG. 8B schematically shows signal lines of a second pixel according to certain embodiments of the present disclosure.
Figure 8A:
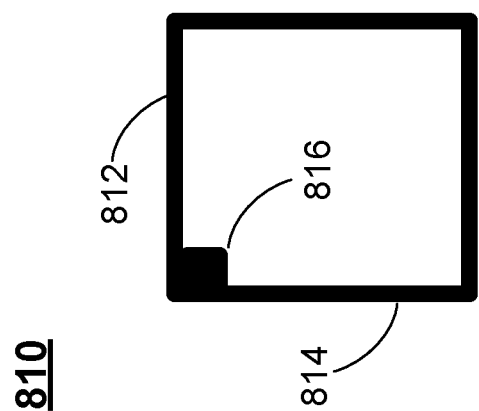
FIG. 8A schematically shows signal lines of a first sub-pixel according to certain embodiments of the present disclosure.

It should be noted that the shape of the signal lines of the second pixels are not limited to curved lines as shown in FIG. 3B or zigzag lines as shown in FIG. 6B or 7B. For example, FIGS. 8A, 8B and 8C schematically show the signal lines of a first sub-pixel and the corresponding second pixel according to another embodiment of the present disclosure. As shown in FIG. 8A, the signal lines of the first sub-pixel 810 include a first gate line 812 and a first data line 814, which are both straight lines and electrically connected to the TFT 816. As shown in FIG. 8B, the signal lines of the second pixel 820 include a second gate line 822 and a second data line 824 electrically connected to the TFT 826. Specifically, the second gate line 822 and the second data line 824 are both tooth saw-shaped lines tilted from the corresponding first gate line 812 and first data line 814 by tilting counter-clockwise with a tilting angle $\theta$. In certain embodiments, the tilting angle $\theta$ is greater than 3° and less than 45°. FIG. 8C shows schematically shows an overlapping top view of the signal lines as shown in FIG. 8A and the signal lines as shown in FIG. 8B, where the second signal line pattern (which is formed by the second gate lines 822 and the second data lines 824) at least partially overlays with the first signal line pattern (which is formed by the first gate lines 812 and the first data lines 814) at edges of the first sub-pixel 810 and the second pixel 820.

Figure 9C:
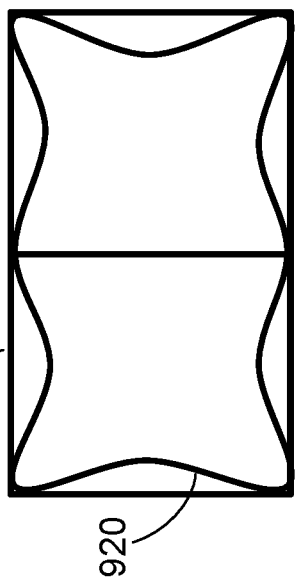
FIG. 9C schematically shows an overlapping top view of the signal lines as shown in FIG. 9A and the signal lines as shown in FIG. 9B according to certain embodiments of the present disclosure.
Figure 9A:
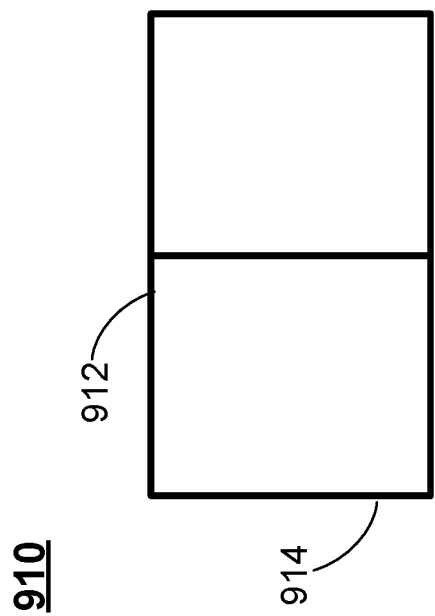
FIG. 9A schematically shows signal lines of two first sub-pixels according to certain embodiments of the present disclosure.
Figure 9B:
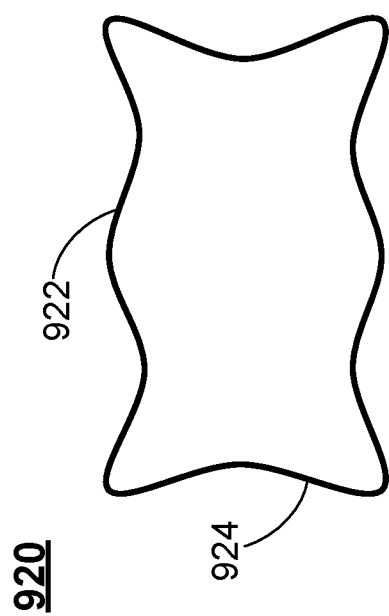
FIG. 9B schematically shows signal lines of a second pixel according to certain embodiments of the present disclosure.

In certain embodiments, when the first pixels are arranged in the quad pixel structure 500 as shown in FIG. 5, the second pixels may be arranged not be one-to-one corresponding to each of the sub-pixels of the first pixels 510. For example, FIGS. 9A, 9B and 9C schematically show the signal lines of a two sub-pixels and the corresponding second pixel according to another embodiment of the present disclosure. As shown in FIG. 9A, the signal lines of the two first sub-pixels 910 include a first gate line 912 and multiple first data lines 914, which are both straight lines. As shown in FIG. 9B, the signal lines of the second pixel 920 include a second gate line 922 and a second data line 924, which are curved lines with one wave along the sides of each of the first sub-pixels 910. FIG. 9C shows schematically shows an overlapping top view of the signal lines as shown in FIG. 9A and the signal lines as shown in FIG. 9B, where the second signal line pattern (which is formed by the second gate lines 922 and the second data lines 924) at least partially overlays with the first signal line pattern (which is formed by the first gate lines 912 and the first data lines 914) at edges of the first sub-pixel 910 and the second pixel 920.

In the embodiments as discussed above, the first signal lines of the first display structure are straight lines. Thus, resistivity of the first signal lines may maintain minimized. Meanwhile, the shapes of the second signal lines of the second display structure are changed to be not straight lines, such as zigzag lines, curved lines or saw-tooth lines, such that the second signal line pattern can be different from the first signal line pattern. It should be noted that other shapes of non-straight lines may be used as the second signal lines, without being limited to the embodiments as discussed above.

In certain embodiments, the shift of the second signal lines (which are non-straight lines) from the corresponding first signal lines should be optimized. For example, factors or parameters such as the wave numbers or amplitudes of the curved lines or zigzag lines and/or the tilting angles of the saw-tooth lines can be determined through simulations or experiments to determine the optimized parameters being used as the second signal lines.

The display cell structure as described in the embodiments of the present disclosure utilizes only two substrates and three polarizer layers, and does not require using a diffusing layer. Thus, the total weight and overall thickness of the display cell structure can be reduced, which may facilitate the use of the display cell structure in a display device of a mobile device. Further, material and manufacturing cost of the display cell structure may be correspondingly reduced.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A display cell structure, comprising:
a first substrate and a second substrate spaced apart from each other;
a first polarizer layer disposed on the first substrate facing an opposite side to the second substrate;
a second polarizer layer disposed between the first substrate and the second substrate, forming a first cell gap between the first substrate and the second polarizer layer and a second cell gap between the second substrate and the second polarizer layer;
a third polarizer layer disposed on the second substrate facing an opposite side to the first substrate;
a first display structure disposed in the first cell gap between the first substrate and the second polarizer layer, the first display structure comprising:
a first liquid crystal layer disposed in the first cell gap between the first substrate and the second polarizer layer, defining a plurality of first pixels; and
a plurality of color filters disposed on the first substrate and facing the second polarizer layer; and
a plurality of first signal lines disposed on the first substrate and facing the second polarizer layer, forming a first signal line pattern;
a second display structure disposed in the second cell gap between the second substrate and the second polarizer layer, the second display structure comprising:
a second liquid crystal layer disposed in the second cell gap between the second substrate and the second polarizer layer, defining a plurality of second pixels; and
a plurality of second signal lines disposed on the second substrate and facing the second polarizer layer, forming a second signal line pattern, wherein the second signal line pattern is different from the first signal line pattern;
wherein each of the first pixels has a plurality of first sub-pixels in a first quantity A, each of the second pixels corresponds to a plurality of the first sub-pixels in a second quantity B, each of A and B is a positive integer greater than 1, and A is greater than B.

2. The display cell structure of claim 1, wherein the first signal lines comprise a plurality of first data lines along a first direction, and a plurality of first gate lines along a second direction, and the second signal lines comprise a plurality of second data lines substantially along the first direction, and a plurality of second gate lines substantially along the second direction.

3. The display cell structure of claim 1, wherein the second polarizer layer is a wire grid polarizer layer.

4. The display cell structure of claim 1, wherein a first size of each of the first pixels is different from a second size of each of the second pixels.

5. The display cell structure of claim 1, wherein the second signal line pattern overlays with the first signal line pattern at edges of sub-pixels of the first pixels and the second pixels.

6. The display cell structure of claim 1, wherein:
A=4 and B=3; or
A=3 and B=2; or
A=4 and B=2.

7. The display cell structure of claim 1, wherein the second pixels comprise at least one second pixel corresponding to the first sub-pixels of a same one of the first pixels, and at least another second pixel corresponding to the first sub-pixels of two adjacent ones of the first pixels.

8. The display cell structure of claim 1, wherein the first signal lines are straight lines, and the second signal lines are zigzag lines or curved lines.

9. The display cell structure of claim 8, wherein the second signal lines are the zigzag lines, and for each of the second pixels, the second signal lines include one or more waves.

10. The display cell structure of claim 8, wherein each of the second signal lines is a saw-tooth shaped line such that for each of the first pixels and a corresponding one of the second pixels, the second signal lines are tilted from the corresponding first signal lines.

11. The display cell structure of claim 10, wherein a tilt angle of each of the second signal lines and the corresponding first signal line is greater than 3° and less than 45°.

12. A display cell structure, comprising:
a first substrate and a second substrate spaced apart from each other;
a first polarizer layer disposed on the first substrate facing an opposite side to the second substrate;
a second polarizer layer disposed between the first substrate and the second substrate, forming a first cell gap between the first substrate and the second polarizer layer and a second cell gap between the second substrate and the second polarizer layer;
a third polarizer layer disposed on the second substrate facing an opposite side to the first substrate;
a first display structure disposed in the first cell gap between the first substrate and the second polarizer layer, the first display structure comprising:
a first liquid crystal layer disposed in the first cell gap between the first substrate and the second polarizer layer, defining a plurality of first pixels; and
a plurality of color filters disposed on the first substrate and facing the second polarizer layer; and
a plurality of first signal lines disposed on the first substrate and facing the second polarizer layer, forming a first signal line pattern;
a second display structure disposed in the second cell gap between the second substrate and the second polarizer layer, the second display structure comprising:
a second liquid crystal layer disposed in the second cell gap between the second substrate and the second polarizer layer, defining a plurality of second pixels; and
a plurality of second signal lines disposed on the second substrate and facing the second polarizer layer, forming a second signal line pattern,
wherein the second signal line pattern overlays with the first signal line pattern at edges of sub-pixels of the first pixels and the second pixels, the first signal lines are straight lines, and the second signal lines are zigzag lines or curved lines; and
wherein each of the first pixels has a plurality of first sub-pixels in a first quantity A, each of the second pixels corresponds to a plurality of the first sub-pixels in a second quantity B, each of A and B is a positive integer greater than 1, and A is greater than B.

13. The display cell structure of claim 12, wherein the first signal lines comprise a plurality of first data lines along a first direction, and a plurality of first gate lines along a second direction, and the second signal lines comprise a plurality of second data lines substantially along the first direction, and a plurality of second gate lines substantially along the second direction.

14. The display cell structure of claim 12, wherein the second signal lines are the zigzag lines, and for each of the second pixels, the second signal lines include one or more waves.

15. The display cell structure of claim 12, wherein the second polarizer layer is a wire grid polarizer layer.

16. The display cell structure of claim 12, wherein a first size of each of the first pixels is different from a second size of each of the second pixels.

17. The display cell structure of claim 12, wherein the second pixels do not one-to-one correspond to the first pixels.

18. The display cell structure of claim 12, wherein:
A=4 and B=3; or
A=3 and B=2; or
A=4 and B=2.

19. The display cell structure of claim 12, wherein each of the second signal lines is a saw-tooth shaped line such that for each of the first pixels and a corresponding one of the second pixels, the second signal lines are tilted from the corresponding first signal lines.

20. The display cell structure of claim 19, wherein a tilt angle of each of the second signal lines and the corresponding first signal line is greater than 3° and less than 45°.

* * * * *